UNITED STATES PATENT OFFICE.

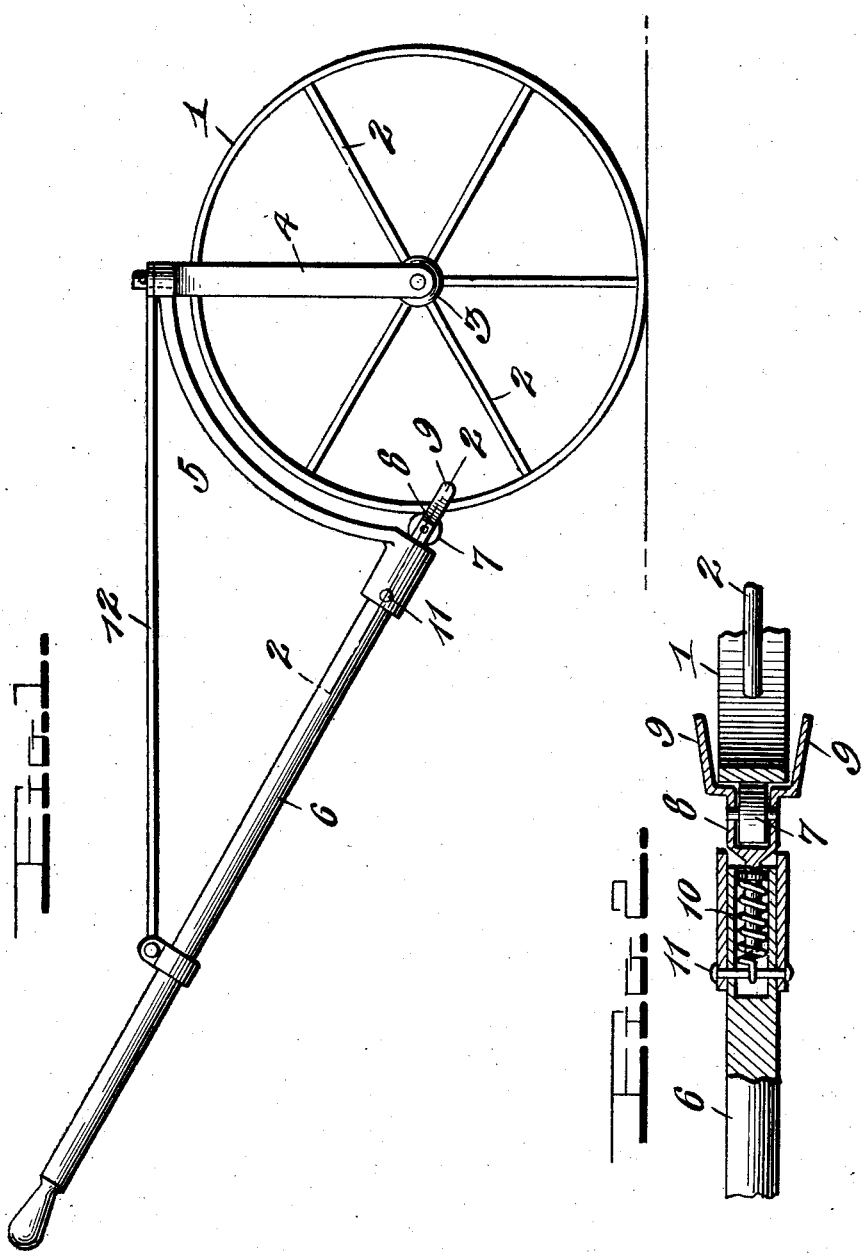

WILLIAM PLUMMER, OF INDIANAPOLIS, INDIANA.

PUSH-WHEEL.

1,021,554.  Specification of Letters Patent.  Patented Mar. 26, 1912.

Application filed July 25, 1911. Serial No. 640,451.

*To all whom it may concern:*

Be it known that I, WILLIAM PLUMMER, a citizen of the United States, residing at Indianapolis, in the county of Marion and State of Indiana, have invented certain new and useful Improvements in Push-Wheels, of which the following is a specification, reference being had to the accompanying drawings.

This invention relates to toys, and more particularly to a wheel in the class known as hoops or push wheels, and has for its object to provide a wheel which can be easily manipulated by a child and used for racing and other purposes.

Other objects of this invention will become apparent as it is more fully set forth.

In the accompanying drawings which illustrate by way of example, an embodiment of this invention; Figure 1 represents a view in elevation of a wheel embodying this invention; Fig. 2 is a sectional view along the line 2—2 of Fig. 1.

Similar reference characters refer to similar part throughout the drawings.

In the construction shown in the drawings, 1 represents a wheel, that has provided thereon, spokes 2, and a hub 3. Pivoted to the hub by any suitable means, is a fork 4 that is normally disposed vertically above the same, and which has a segmental arm 5 attached to this upper portion, the lower portion of which is arranged to receive a handle 6, so that the same can be disposed therein and project to the front portion thereof. A pulley 7 mounted on a bifurcated arm 8, and provided with wings 9 on either side of it so as to keep the pulley from running off the rim of the wheel 1, with which it is in contact, is disposed within said end portion of the handle 6, and the end of the arm 5, as is clearly shown in the drawings. A coil spring 10 is arranged in the handle 6 and secured to a pin 11, to keep the pulley against the rim of the wheel, as shown in the drawings.

Secured to the central portion of the handle 6 and the upper portion of the fork 4 is a connecting brace 12. This brace being provided for general strengthening purposes, and also to assist in guiding the wheel.

The general operation of the device, consists of pushing on the handle of the wheel and running with the wheel, and suitably moving the handle to guide the device along.

Obviously, while there is shown but one modification of the construction of this invention in the drawings, it is not desired to limit this application for a patent in any way, otherwise than is necessitated by the prior art, as many modifications of the construction of this invention may be made without departing from the principles thereof.

Having thus described this invention it is claimed:

1. A racing wheel, comprising a wheel, a fork pivoted to the hub of said wheel, a handle, means disposed in said handle for engaging in the rim of said wheel, and a brace connecting the upper portion of said frame and said handle.

2. A wheel of the character described, comprising a wheel, a fork pivoted to the hub of said wheel, a handle, a bifurcated arm mounted to reciprocate in one end of said handle, a pulley mounted in said handle and arranged to engage the hub of said wheel, resilient means for forcing said pulley against the rim, wings adapted to embrace the rim of the wheel for guiding the same, a segmental brace connecting the upper portion of said fork and said end of the handle together, and another brace connecting the upper portion of said fork and said handle.

In testimony whereof I hereunto affix my signature in the presence of two witnesses.

WILLIAM PLUMMER.

Witnesses:
PAUL R. SCHOENROGG,
MARTIN BAECHER.

---

Copies of this patent may be obtained for five cents each, by addressing the "Commissioner of Patents, Washington, D. C."